No. 778,497. PATENTED DEC. 27, 1904.
A. H. MARKS.
PNEUMATIC TIRE OR OTHER TUBULAR FLEXIBLE ARTICLE.
APPLICATION FILED MAR. 31, 1904. RENEWED NOV. 10, 1904.

No. 778,497. Patented December 27, 1904.

UNITED STATES PATENT OFFICE.

ARTHUR H. MARKS, OF AKRON, OHIO.

PNEUMATIC TIRE OR OTHER TUBULAR FLEXIBLE ARTICLE.

SPECIFICATION forming part of Letters Patent No. 778,497, dated December 27, 1904.

Application filed March 31, 1904. Renewed November 10, 1904. Serial No. 232,132.

*To all whom it may concern:*

Be it known that I, ARTHUR H. MARKS, a citizen of the United States, residing at Akron, in the county of Summit and State of Ohio, have invented certain new and useful Improvements in Pneumatic Tires or other Tubular Flexible Articles, of which the following is a specification.

This invention relates to improvements in pneumatic tires, tire-covers, and other tubular flexible articles designed to withstand internal pressure; and the object is to so construct articles of this character that they will be more durable and less liable to burst while in use.

With the above object in view the invention consists in the novel features of construction hereinafter fully described, particularly pointed out in the claims, and clearly illustrated by the accompanying drawings, in which—

Figure 1:
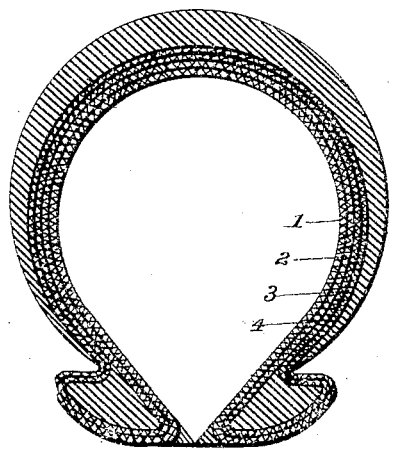
Figure 2:
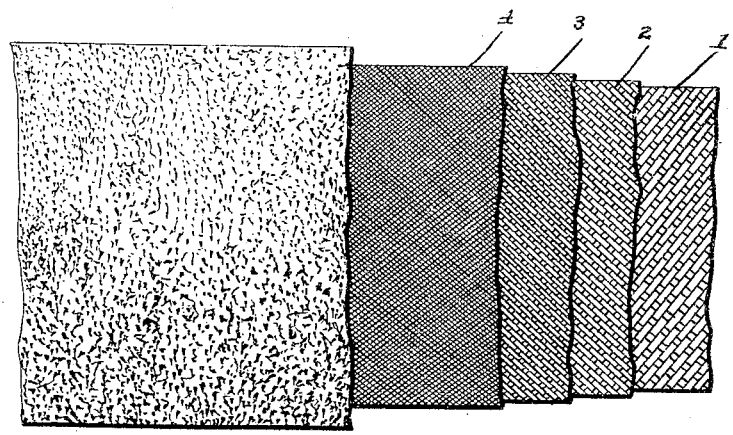

Figure 1 is a transverse sectional view showing a tire-cover constructed in accordance with my invention, and Fig. 2 a plan view showing the successive layers of fabric employed in the construction of the improved cover.

In my application for Letters Patent filed September 9, 1904, Serial No. 223,846, I have claimed, broadly, means for increasing the life of a tire or other tubular flexible article by rendering it less liable to burst under pressure, the invention consisting, broadly, in providing layers of reinforcing material of varying degrees of elasticity, the layer having the greatest degree of elasticity being arranged innermost and each succeeding layer of less elasticity than its predecessor, whereby the structure will stretch uniformly when subjected to pressure.

In the present case I have disclosed another structure for carrying out the broad idea.

The elasticity of the several layers 1, 2, 3, and 4 is varied in the structure here illustrated by forming the same of fabric of different texture and weave. Layer 1 is of maximum elasticity, layer 2 of slightly less elasticity, layer 3 of decreasing elasticity, and layer 4 of minimum elasticity, whereby under pressure the entire structure will stretch uniformly. It will be understood that any desired number of layers or plies per layer may be used.

I also do not limit my invention to tire-covers, as what is known as a "single-tube" pneumatic tire may be constructed in the same manner, as also may hose or, in fact, any yielding or flexible tubular body designed to withstand internal pressure, and while I show and describe a tire-cover constructed in accordance with my improvement I do not limit my invention to this specific application of the idea, as I claim it broadly.

Having thus fully described my invention, what I claim, and desire to secure by Letters Patent of the United States, is—

1. In a tire-cover, a plurality of layers of fabric constructed and arranged so that the elasticity of each layer decreases beginning with the innermost layer, for the purpose set forth.

2. In a tire-cover, a plurality of layers of fabric of varying elasticity arranged with the layer of maximum elasticity innermost and each succeeding layer of fabric of less elasticity than its predecessor, for the purpose set forth.

3. In a tire-cover, a plurality of layers of fabric of varying elasticity, the layer of fabric of the smallest arc being constructed and arranged to have the greatest elasticity and the elasticity of the other layers decreasing as their arcs increase, for the purpose set forth.

4. A pneumatic-tire cover composed of rubber and layers of fabric of varying elasticity arranged with the layer of maximum elasticity innermost and each succeeding layer of less elasticity than its predecessor, for the purpose set forth.

5. A tire-cover comprising a plurality of layers of fabric of different texture to give layers of different degrees of elasticity, the layer of fabric of the weave giving the greatest elasticity being positioned innermost and each succeeding layer of less elasticity than its predecessor, for the purpose set forth.

6. A pneumatic-tire cover composed of rubber and layers of fabric of different weaves to give layers of different elasticity, the layer of fabric of greatest elasticity being arranged innermost and each succeeding layer being of less elasticity than its predecessor, for the purpose set forth.

7. A tire element comprising a plurality of layers of fabric or the like constructed and arranged so that the elasticity of each layer decreases beginning with the innermost layer.

8. A yielding tubular body designed to withstand internal pressure, composed of rubber and layers of fabric or the like constructed and arranged so that the elasticity of each layer decreases beginning with the innermost layer.

In testimony whereof I have signed my name to this specification in presence of two witnesses.

ARTHUR H. MARKS.

Witnesses:
O. S. HART,
A. L. PARDEE.